(12) United States Patent
Karimli et al.

(10) Patent No.: US 10,595,171 B2
(45) Date of Patent: Mar. 17, 2020

(54) DEDICATED UPLINK CHANNEL FOR MULTIMEDIA MULTICAST SERVICES IN A WIRELESS COMMUNICATION NETWORK

(71) Applicant: T-Mobile USA, Inc., Bellevue, WA (US)

(72) Inventors: Yasmin Karimli, Kirkland, WA (US); Puja Gupta, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 60 days.

(21) Appl. No.: 15/445,297

(22) Filed: Feb. 28, 2017

(65) Prior Publication Data
US 2018/0249304 A1 Aug. 30, 2018

(51) Int. Cl.
*H04W 4/20* (2018.01)
*H04W 4/06* (2009.01)
*H04W 4/12* (2009.01)

(52) U.S. Cl.
CPC ............... *H04W 4/20* (2013.01); *H04W 4/06* (2013.01); *H04W 4/12* (2013.01)

(58) Field of Classification Search
CPC ...................................................... H04W 4/20
USPC ......................................................... 370/312
See application file for complete search history.

(56) References Cited

U.S. PATENT DOCUMENTS

| 6,785,253 B1* | 8/2004 | Du ........................ H04B 7/2606 370/338 |
| 2001/0005359 A1* | 6/2001 | Bergqvist .............. H04W 48/06 370/230 |
| 2003/0228865 A1* | 12/2003 | Terry .................... H04W 48/08 455/422.1 |
| 2005/0042987 A1* | 2/2005 | Lee ...................... H04W 72/005 455/67.11 |
| 2006/0198325 A1* | 9/2006 | Gao ....................... H04L 1/0057 370/270 |
| 2007/0149227 A1* | 6/2007 | Parizhsky ............... H04L 47/10 455/509 |
| 2009/0305712 A1* | 12/2009 | Franceschini ......... H04W 52/08 455/450 |
| 2015/0049689 A1* | 2/2015 | Seo ........................ H04L 5/005 370/329 |
| 2015/0304378 A1* | 10/2015 | Bi ....................... H04L 65/4076 370/329 |

\* cited by examiner

*Primary Examiner* — Samina F Choudhry
(74) *Attorney, Agent, or Firm* — Lee & Hayes, P.C.

(57) ABSTRACT

A wireless communication network includes a plurality of cells, where at least one of the cells periodically transmits content to a plurality of user devices in a predetermined geographic area over one or more dedicated downlink channels as a multimedia broadcast multicast service. The at least one cell receive messages from one or more of the plurality of user devices over one or more dedicated uplink channels, where the messages relate to feedback in the form of messages and/or content pertaining to the content received by the one or more of the plurality of user devices.

20 Claims, 5 Drawing Sheets

DEDICATED UPLINK CHANNEL FOR MULTIMEDIA MULTICAST SERVICES IN A WIRELESS COMMUNICATION NETWORK

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as user devices or mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

Often, operators of wireless communication networks wish to provide content to large numbers of user devices. Such content can include, but is not limited to, files, software updates, media content, etc. In order to provide such content to multiple user devices simultaneously in an efficient manner, cells within a wireless communication network may simultaneously broadcast the content to user devices within their respective cells. In other words, the base stations of the cells may simultaneously broadcast the content to the user devices within their respective cells. Often, such broadcasting of the content is performed over one or more dedicated downlink channels to the user devices. Currently, however, there is no way for the user devices to efficiently communicate with the cells as to reception of the content other than to use one or more control channels, e.g., long term evolution (LTE) channels. Thus, when user devices attempt to communicate with the cells regarding the received content using the control channels, the wireless communication network may become overloaded.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
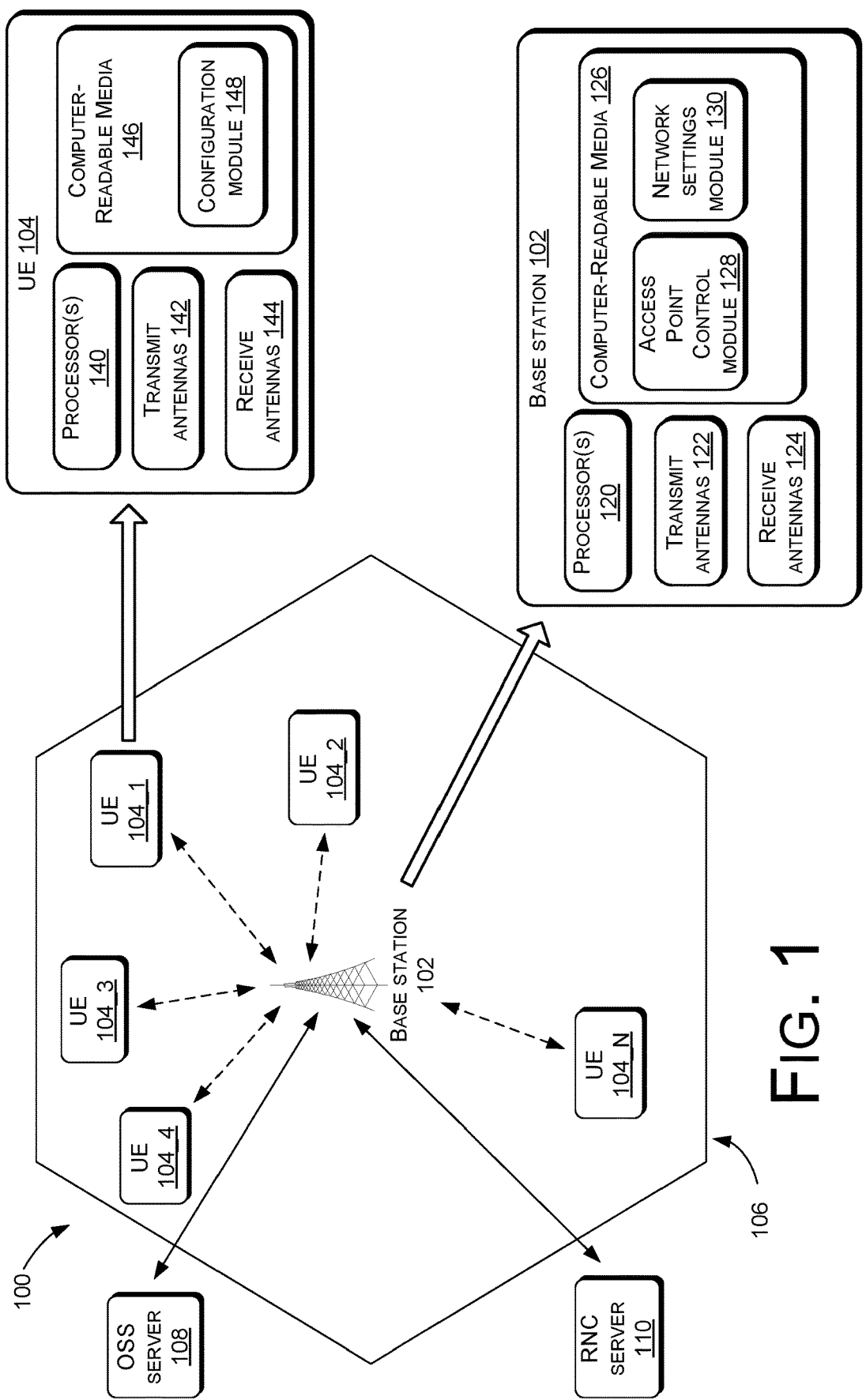
FIG. 1 schematically illustrates a wireless communication network, in accordance with various embodiments.

Described herein are techniques and architecture for providing one or more dedicated uplink channels for receiving feedback from user devices in response to receiving messages and/or content within a wireless communication network via a multimedia broadcast multicast service (MBMS). The content may comprise, for example, software updates, application downloads, streaming of media content, etc. In embodiments, uplink content may also be provided by a user over the one or more dedicated uplink channels and may include, for example, user videos, photos, applications, files, etc., that the user may wish to share with a set of other users. In particular, the techniques and architecture described herein may be utilized so that user devices can provide messages providing feedback to one or more cells within the wireless communication network that provided the content via the multimedia broadcast multicast service. The messages can provide feedback relating to various parameters of the received messages and/or content such as, for example, quality of service (QoS), quality of experience (QoE), corruption of a file received, the need to change channels, etc.

Generally, wireless communication networks communicate with user devices utilizing a unicast messaging process. A message (which may or may not include content), or just content, is broadcast one on one from a base station or an access point directly to a user device within a cell of the wireless communication network. Likewise, the user device communicates in a one on one fashion with the base station or access point. However, if a common message and/or content is meant for multiple user devices within the wireless communication network, the message and/or content may be broadcast simultaneously to multiple user devices. For such a simultaneous broadcast, multiple base stations and/or access points may broadcast the message and/or content to the user devices simultaneously within one or more cells of the wireless communication network using one or more dedicated downlink channels during the broadcast. This may allow for more efficiency in the transmission of the message and/or content and may provide a lower cost for common messages and/or content. Such an arrangement is generally referred to as a multimedia broadcast multicast service. For 3rd Generation Partnership Project (3GPP) Long Term Evolution (LTE) systems, the service is referred to as an evolved multimedia broadcast multicast service (eMBMS).

In embodiments, in order for user devices to then efficiently and quickly communicate with the base station or access point from which the message and/or content was received via the eMBMS broadcast, one or more dedicated uplink channels may be provided during an eMBMS broadcast. The one or more dedicated uplink channels may be utilized by the user devices to provide messages to the access point or base station from the message and/or content was received. The messages may include feedback pertaining to the received message and/or content such as, for example, quality of service (QoS), quality of experience (QoE), corruption of a file received, the need to change channels, etc.

In embodiments, the dedicated uplink channels and the dedicated downlink channels may be dedicated only during certain times of the day. For example, during busy hours of the day, the dedicated downlink channels and the dedicated uplink channels may be utilized for unicast purposes due to the high volume of user device traffic within the wireless communication network. However, within a particular geographic region of the wireless communication network, a special event may be occurring. Thus, during the special event, for the specific geographic region, the dedicated uplink channels and the dedicated downlink channels may be dedicated for use for MBMS transmission of messages regardless of the time of day. The specific geographic region may be a small region or may be a large region, which may include the entire geographic region of the wireless communication network. In embodiments, there may be multiple dedicated uplink channels or there may be only a single uplink channel. Likewise, in embodiments, there may be multiple dedicated downlink channels or there may be only a single dedicated downlink channel.

In embodiments, the dedicated uplink channels and the dedicated downlink channels may serve as dedicated channels during less busy times within the wireless communication network. For example, the dedicated uplink channels and the dedicated downlink channels may serve as dedicated channels at night. This can allow for utilizing the dedicated channels for software updates, application downloads, streaming of media content, etc. Dedicated uplink channels can allow for the provision of feedback from the user devices based upon the received content. In embodiments, the dedicated uplink channels and the dedicated downlink channels may serve as dedicated channels on a full-time basis.

FIG. 1 illustrates a wireless communication network 100 (also referred to herein as network 100). The network 100 comprises a base station (BS) 102 communicatively coupled to a plurality of user devices or user equipment, referred to as UEs 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, as will be discussed further herein, the network 100 comprises a plurality of macro cells 106, with each macro cell 106 including one or more BSs 102 and/or access points (not illustrated).

In an embodiment, the UEs 104_1, . . . , 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, desktop computers, palmtops, pagers, devices configured as Internet of Things (IoT) devices, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipment, e.g., an operation support subsystem (OSS) server 108, a radio network controller (RNC) 110, and/or the like. The RNC 110 generally serves as a gateway for the wireless communication network 100 and can also be in the form of a mobility management entity when the wireless communication network 100 operates according to the long term evolution (LTE) standard or LTE Advanced standard.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an enodeB (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130.

Although FIG. 1 illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 10, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 10. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 130 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 102 accordingly.

Figure 2:
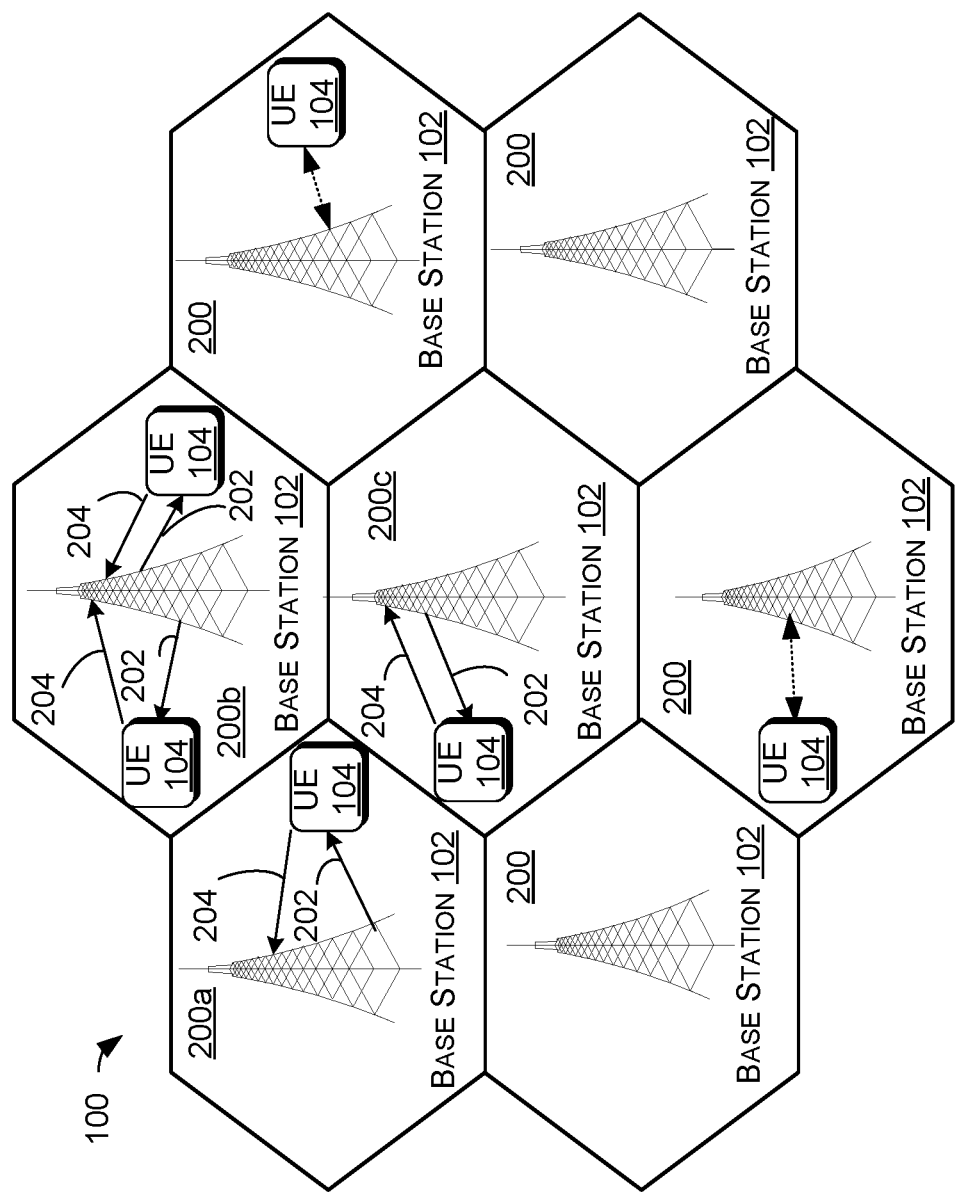
FIG. 2 schematically illustrates an example of several cells within the wireless communication network 100 of FIG. 1.

FIG. 2 illustrates multiple cells 200 that may each correspond to the macro cell 106 of FIG. 1. Each cell 200 may include one or more base stations 102. In embodiments, each cell 200 may include one or more access points (not illustrated) that communicate with a base station 102 of the cell 200 in which the access points are located and also communicate with the UEs 104 located within the cell 200.

In accordance with embodiments, one or more of the cells 200 may be periodically configured by, e.g., the RNC server 110 to provide a multimedia broadcast multicast service (MBMS) to a specific geographic region within the wireless communication network 100 that includes the one or more cells 200. Thus, the base stations 200 (along with any included access points) may periodically broadcast a message and/or content to UEs 104 within one or more of the cells 200 via a MBMS broadcast. The content may comprise, for example, software updates, application downloads, streaming of media content, etc.

As an example, a first cell 202*a*, a second cell 202*b* and a third cell 202*c*, may all simultaneously broadcast a message and/or content to UEs 104 within their respective cells. Each cell 200 may include one or more dedicated downlink channels 202 for simultaneously broadcasting the message and/or the content during the MBMS broadcast. In accordance with embodiments, during the MBMS broadcast of messages and/or content, each cell 200 involved in the MBMS broadcast may include one or more dedicated uplink channels 204 for receiving feedback in the form of messages and/or content pertaining to the received message and/or content from UEs 104 within their respective cell 200.

In embodiments, each cell 200 may include multiple dedicated downlink channels 202 or may include only a single dedicated downlink channel 202. Likewise, in embodiments, each cell 200 may include multiple dedicated uplink channels 204 or may include only a single uplink channel 204. Each dedicated downlink channel 202 and dedicated uplink channel 204 comprises either a multicast channel or a unicast channel. The dedicated uplink channels 204 may be assigned to UEs 104 by a scheduler based on different factors such as an amount of data to be sent, e.g. is an uplink multicast channel needed or is an uplink unicast channel sufficient. The dedicated uplink channels 204 may also be assigned by the scheduler through round robin or other scheduling mechanisms. The scheduler may be included within, for example, the RNC server 110. The feedback from the UEs 104 may include, for example, quality of service (QoS), quality of experience (QoE), corruption of a file received, the need to change channels, etc. In embodiments, uplink content may also be provided by a UE 104 over the one or more dedicated uplink channels 204 and may include, for example, user videos, photos, applications, files, etc., that a user of the UE 104 may wish to share with a set of other UEs 104 and thus, the users of the set of other UEs 104.

In embodiments, the dedicated downlink channels 202 and the dedicated uplink channels 204 may be dedicated only during certain times of the day. For example, during busy hours of the day, the dedicated downlink channels 202 and the dedicated uplink channels 204 may be utilized for unicast purposes due to the high volume of UE 104 traffic within the wireless communication network 100. However, within a particular geographic region of the wireless communication network 100, a special event may be occurring. Thus, during the special event, for the specific geographic region, the dedicated downlink channels 202 and the dedicated uplink channels 204 may be dedicated for use for MBMS transmission of messages regardless of the time of day. The specific geographic region may be a small region or may be a large region, which may include the entire geographic region of the wireless communication network 100.

In embodiments, the dedicated downlink channels 202 and the dedicated uplink channels 204 may serve as dedicated channels during less busy times within the wireless communication network 100. For example, the dedicated downlink channels 202 and the dedicated uplink channels 204 may serve as dedicated channels only at night, while serving as unicast channels during other times of the day. This can allow for utilizing the dedicated downlink channels 202 for software updates, application downloads, streaming of media content, etc., when there is less UE 104 traffic within the wireless communication network 100. Dedicated uplink channels 204 can allow for the provision of feedback from the UEs 104 based upon the received messages and/or content. In embodiments, the dedicated downlink channels 202 and the dedicated uplink channels 204 may serve as dedicated channels on a full-time basis.

Figure 3:
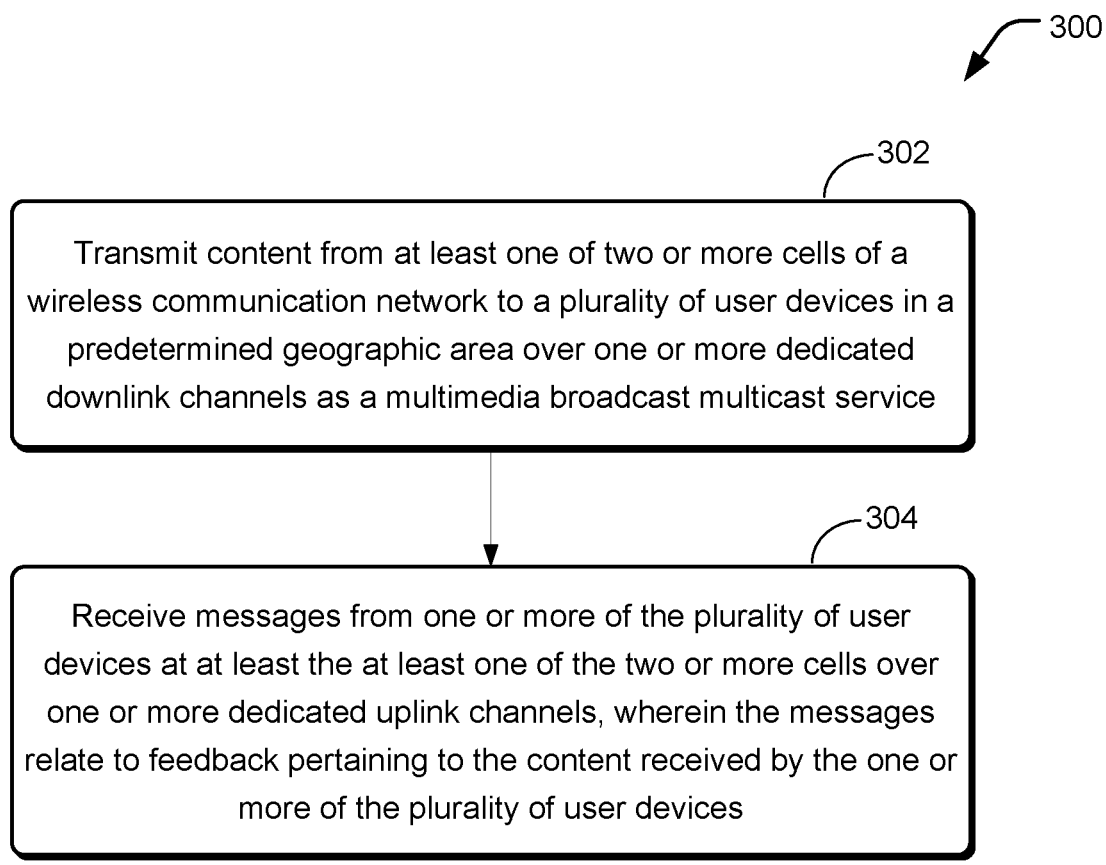
FIG. 3 is a flowchart illustrating an example method of broadcasting content as a multimedia broadcast multicast service in the wireless communication network of FIG. 1, in accordance with various embodiments.

FIG. 3 is a flowchart illustrating a method 300 of broadcasting content in a wireless communication network, e.g., wireless communication network 100 of FIG. 1, as a multimedia broadcast multicast service. As illustrated, at block 302, the content is transmitted from at least one of two or more cells, e.g., cells 200 of FIG. 2, of the wireless communication network to a plurality of user devices, e.g., UEs 104 of FIGS. 1 and 2, in a predetermined geographic area over one or more dedicated downlink channels as a multimedia broadcast multicast service. At block 304, messages are received from one or more of the plurality of user devices at at least the at least one of the two or more cells over one or more dedicated uplink channels, wherein the messages relate to feedback pertaining to the content received by the one or more of the plurality of user devices.

Figure 4:
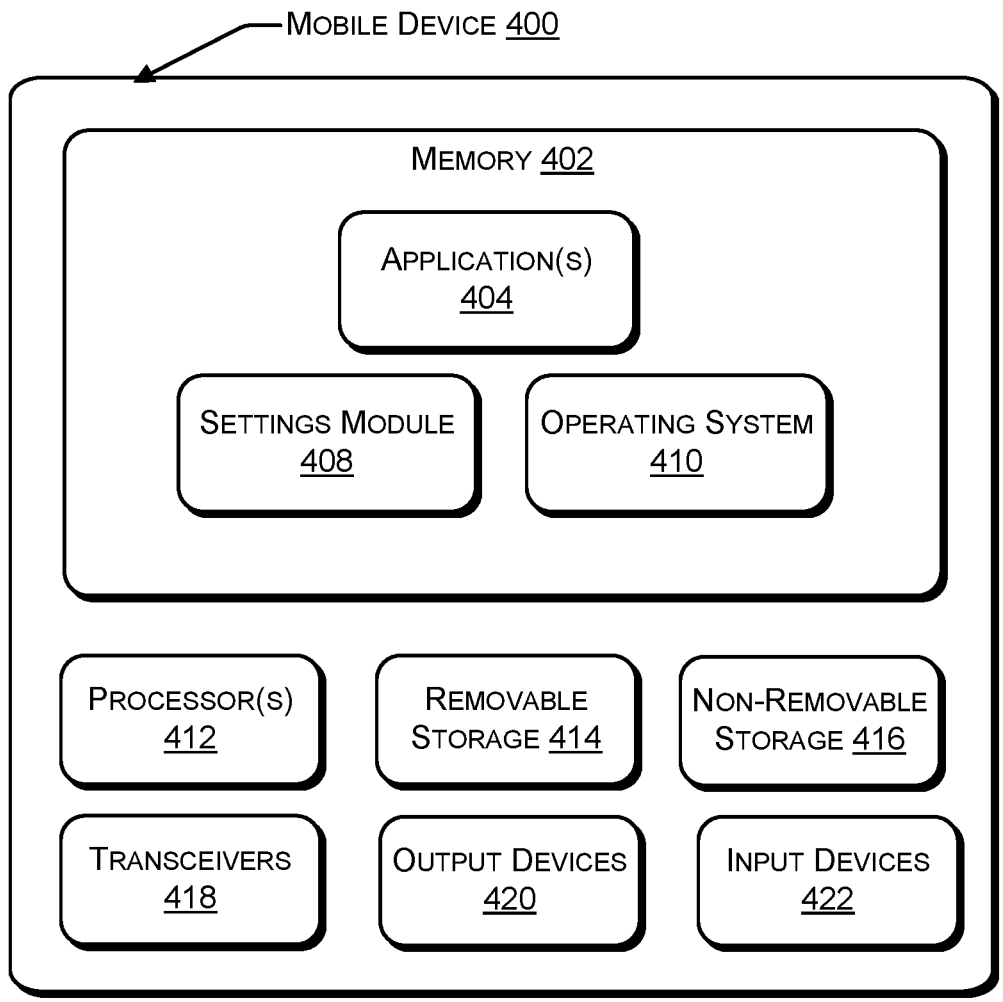
FIG. 4 illustrates a component level view of an example mobile device configured for use in the wireless communication network of FIG. 1.

FIG. 4 illustrates a component level view of a mobile device 400, such as UE 104, configured to function within wireless communication network 100. As illustrated, the mobile device 400 comprises a system memory 402 storing application(s) 404, a settings module 408, and an operating system 410. Also, the mobile device 400 includes processor(s) 412, a removable storage 414, a non-removable storage 416, transceivers 418, output device(s) 420, and input device(s) 422. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The mobile device 400 may also include additional data storage devices (removable and/or non-removable) such as, for example, magnetic disks, optical disks, or tape. Such additional data storage may include removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414 and non-removable storage 416 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 400. Any such non-transitory computer-readable media may be part of the user device 400.

In some implementations, the transceivers 418 include any sort of transceivers known in the art. For example, the transceivers 418 may include a radio transceiver that performs the function of transmitting and receiving radio frequency communications via an antenna. Also or instead, the transceivers 418 may include wireless modem(s) to may facilitate wireless connectivity with other computing devices. Further, the transceivers 418 may include wired communication components, such as an Ethernet port, for communicating with other networked devices.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
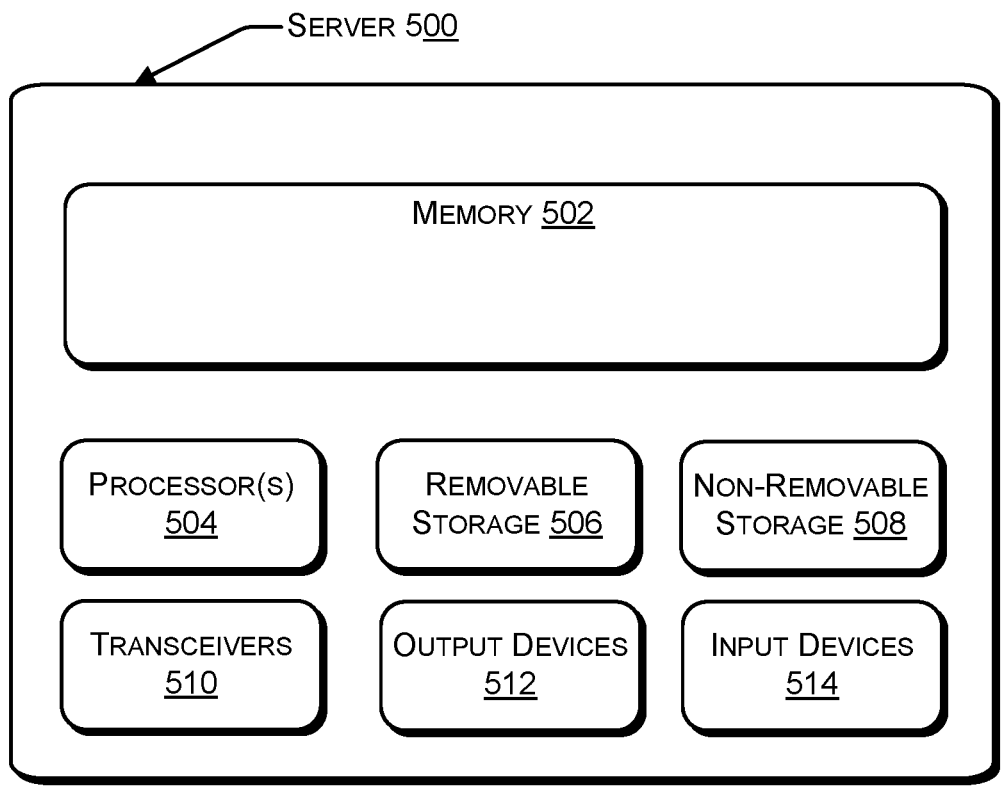
FIG. 5 illustrates a component level view of a server configured for use in the arrangement of FIG. 1 to provide various services of the wireless communication network of FIG. 1.

FIG. 5 illustrates a component level view of a server configured for use within a wireless communication network, e.g., wireless communication network 100 in order to provide various services within the wireless communication network, according to the techniques described herein. The server 500 may be located in the RNC or gateway 110. Additionally, the server 500 may be a separate entity located separately from the RNC 110. As illustrated, the server 500 comprises a system memory 502. Also, the server 500 includes processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.) or some combination of the two. In some implementations, the processor(s) 504 is a central processing unit (CPU), a graphics processing unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also or instead, the transceivers 510 may include wireless modem(s) to may facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A wireless communication network comprising two or more cells, wherein at least one cell comprises an apparatus comprising a processor and a non-transitory storage medium, the non-transitory storage medium storing instructions executable by the processor to:
   at least periodically transmit, by the at least one cell, content to a plurality of user devices in a predetermined geographic area over one or more dedicated downlink channels as a multimedia broadcast multicast service; and
   at least periodically receive, by the at least one cell, messages from one or more of the plurality of user devices over one or more dedicated uplink channels, wherein the messages relate to feedback pertaining to the content received by the one or more user devices, wherein a first channel among the one or more dedicated uplink channels or the one or more dedicated downlink channels serves as a dedicated channel only within a first region of the predetermined geographic area during an event, the first region being smaller than the predetermined geographic area and smaller than a total coverage area of the wireless communication network.

2. The wireless communication network of claim 1, wherein the messages are received, by the at least one cell, from the one or more of the plurality of user devices over a single dedicated uplink multicast channel.

3. The wireless communication network of claim 1, wherein the messages are received, by the at least one cell, from the one or more of the plurality of user devices over multiple dedicated uplink multicast channels.

4. The wireless communication network of claim 1, wherein a second channel among the one or more dedicated downlink channels and the one or more dedicated uplink multicast channels serves as a dedicated channel only during a specific time of day.

5. The wireless communication network of claim 1, wherein a second channel among the one or more dedicated downlink channels and the one or more dedicated uplink multicast channels serves as a dedicated channel only during the event.

6. The wireless communication network of claim 1, wherein the feedback relates to at least one of Quality of Service (QoS), Quality of Experience (QoE), confirmation of receipt, change downlink channel, or corruption of a received file.

7. An apparatus comprising:
   a processor; and
   a non-transitory storage medium storing instructions executable by the processor to:
      at least periodically transmit, by at least one of two or more cells of a wireless communication network, content to a plurality of user devices in a predetermined geographic area over one or more dedicated downlink channels as a multimedia broadcast multicast service; and at least periodically receive, by the at least one cell, messages from one or more of the plurality of user devices over one or more dedicated uplink channels, wherein the messages relate to feedback pertaining to the content received by the one or more of the plurality of user devices, wherein a first channel among the one or more dedicated uplink channels serves as a dedicated channel only within a first region of the predetermined geographic area during an event, the first region being smaller than the predetermined geographic area and smaller than a total coverage area of the wireless communication network.

8. The apparatus of claim 7, wherein messages are received, by the at least one cell, from the one or more of the plurality of user devices over a single dedicated uplink channel.

9. The apparatus of claim 7, wherein messages are received, by the at least one cell, from the one or more of the plurality of user devices over multiple dedicated uplink channels.

10. The apparatus of claim 7, wherein a second channel among the one or more dedicated downlink channels and the one or more dedicated uplink channels serves as a dedicated channel only during a specific time of day.

11. The apparatus of claim 7, wherein a second channel among the one or more dedicated downlink channels and the one or more dedicated uplink channels serves as a dedicated channel only during the event.

12. The apparatus of claim 7, wherein the feedback relates to at least one of Quality of Service (QoS), Quality of Experience (QoE), confirmation of receipt, change downlink channel, or corruption of a received file.

13. A method of broadcasting content in a wireless communication network as a multimedia broadcast multicast service, the method comprising:

transmitting, by at least one of multiple cells of the wireless communication network, the content to a plurality of user devices in a predetermined geographic area over one or more dedicated downlink channels as a multimedia broadcast multicast service; and receiving, by the at least one cell, messages from one or more of the plurality of user devices over one or more dedicated uplink channels, wherein the messages relate to feedback pertaining to the content received by the one or more user devices, wherein, in a first region of the predetermined geographic area that is smaller than the predetermined geographic area, a first channel among the one or more dedicated uplink channels serves as a dedicated multicast channel during a first time period and serves as a unicast channel during a second time period, wherein a second channel among the one or more dedicated downlink channels and the one or more dedicated uplink channels serves as a dedicated channel only within a second region of the predetermined geographic area during an event, the second region being smaller than a total coverage area of the wireless communication network.

14. The method of claim 13, wherein receiving, by the at least one cell, the messages from the one or more user devices comprises receiving, by the at least one cell, the messages from the one or more user devices over multiple dedicated uplink channels.

15. The method of claim 13, wherein a third channel among the one or more dedicated downlink channels and the one or more dedicated uplink channels serves as a dedicated channel only during a specific time of day.

16. The method of claim 13, wherein a third channel among the one or more dedicated downlink channels and the one or more dedicated uplink channels serves as a dedicated channel only during an event.

17. The method of claim 13, wherein the feedback relates to at least one of Quality of Service (QoS), Quality of Experience (QoE), confirmation of receipt, change downlink channel, or corruption of a received file.

18. The method of claim 13, wherein a third channel among the one or more dedicated downlink channels and the one or more dedicated uplink channels serves as a dedicated channel only at night.

19. The method of claim 13, wherein the feedback indicates corruption of a file received via the multimedia broadcast multicast service.

20. The wireless communication network of claim 1, wherein a second channel among the one or more dedicated uplink channels serves as a dedicated multicast channel during a first time period and serves as a unicast channel during a second time period.

* * * * *